April 11, 1939.  C. S. ANDERSEN  2,153,705

TENSION ADJUSTING DEVICE

Filed Sept. 14, 1937

INVENTOR
CHRISTIAN S. ANDERSEN
BY
Brockett, Hyde, Higley + Mayer
ATTORNEYS

Patented Apr. 11, 1939

2,153,705

UNITED STATES PATENT OFFICE 2,153,705

TENSION ADJUSTING DEVICE

Christian S. Andersen, Warren, Pa., assignor to Pennsylvania Furnace & Iron Co., Warren, Pa., a corporation of Pennsylvania Application September 14, 1937, Serial No. 163,786

1 Claim. (Cl. 248—23)

This invention relates to improvements in tension adjusting devices for endless motion transmitting members such as belt and chain drives and the like.

An object of the present invention is to provide an adjustable support for a pulley, sprocket or the like, the support being resiliently flexible around an axis normal to the plane of the endless motion transmitting member and being held rigidly in various adjusted positions by a flexible securing member. It results from such construction that by utilizing a flexible support and a flexible securing member for holding the support in various positions, adjustability is secured while at the same time all of the parts are in fixed and substantially rigid connection with each other and noiseless in operation.

Other novel features of my invention will be apparent from the accompanying drawing and specification and the essential features will be summarized in the claim.

Figure 1:
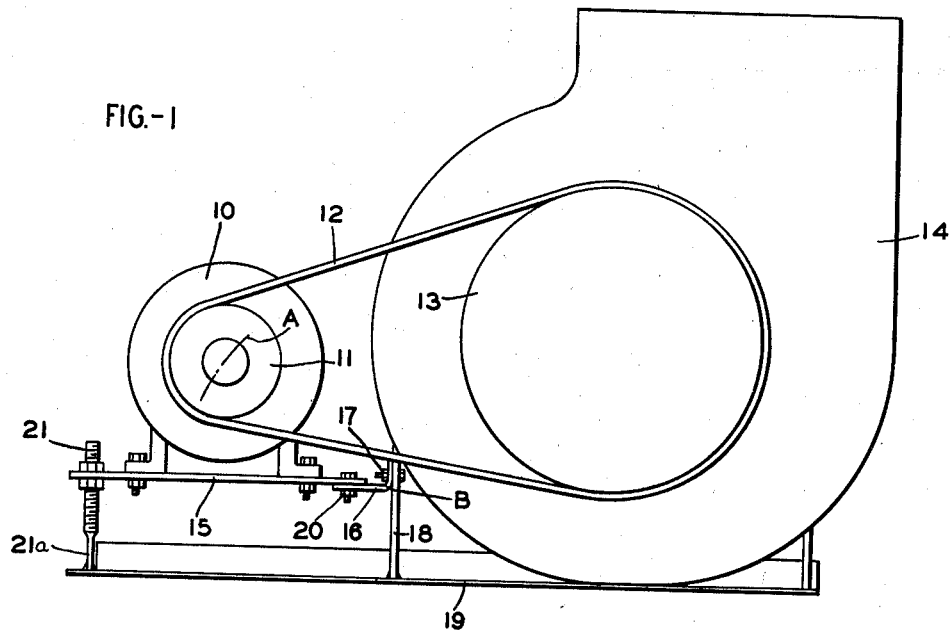
Figure 2:
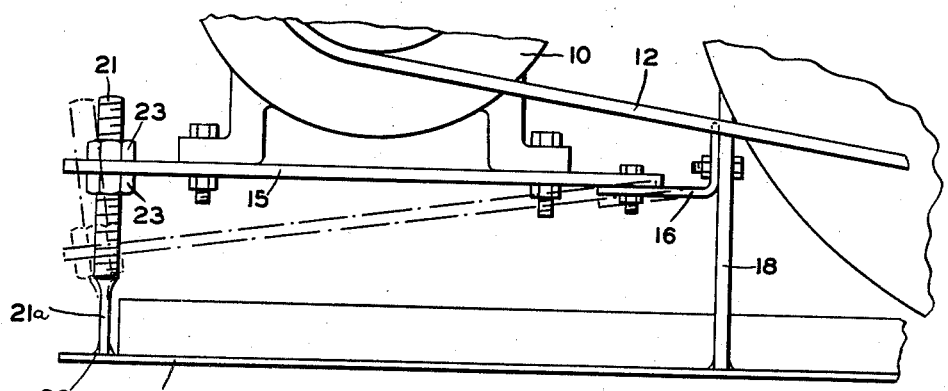
Figure 3:
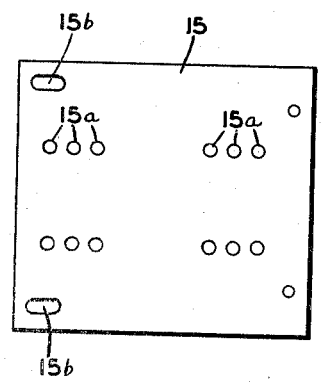
Figure 4:
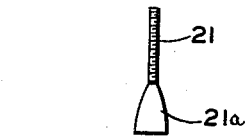

In the drawing, Fig. 1 is an elevational view of a belt drive equipped with my improved tension adjusting device; Fig. 2 is an enlarged detail view of a portion of Fig. 1; Fig. 3 is a plan view of the motor supporting plate of Figs. 1 and 2; while Fig. 4 is a view of one of the adjusting bolts of Figs. 1 and 2.

I have shown my improved tension adjusting device in combination with a motor 10 having a pulley 11 which is connected by endless belt 12 with a pulley 13 of a blower 14. It will be understood, however, that the device is applicable to other drives including chains and sprockets and that the adjustability may be in respect to either a driving or driven rotatable member.

The motor 10 is mounted on a rigid plate 15 which may be provided with a plurality of openings 15a permitting the mounting of the motor in various positions on the plate. At its edge nearer the pulley 13 the plate 15 is provided with a flexible support 16. This support as shown is an angular plate having one end rigidly secured at 17 to a member 18 which is welded between the base 19 and the blower 14 so as to form a rigid support at the point 17. The member 16 is secured at its other end 20 to the plate 15. It will be understood that the member 16 may be metal, fiber or the like. It may be a sheet member or separate straps or bars spaced along the edge of plate 15. Plate 15 and member 16 might be integral to give the same result. The requisite connection is one which is the equivalent of a flexible steel plate, flat spring or the like connecting the plate 15 to the rigid supporting member 18 for bending or swinging movement of said plate as though it were hinged on an axis normal to the plane of the endless member 12, or parallel to the shaft of motor 10.

The support 15 by means of the flexible member 16 is movable to various positions as indicated in full lines and dot-dash lines in Fig. 2. This produces a movement of the motor shaft along substantially the path A, Fig. 1, which is substantially an arc about the point B. For holding the support in various adjusted positions the free or outer end of the support 15 is held by a flexible securing member which is rigidly fastened to the support 15 at one end and rigidly fastened to the base or other fixed member at its other end. The connection shown comprises one or more bolts 21 having their lower ends flattened as at 21a to provide a flexibility in this portion of the bolt. Each bolt is secured at its lower edge as shown at 22 to the base 19 or other rigid support. The fastening means shown is welding. The bolts pass through slotted openings 15b in the plate 15. Nuts 23 threaded on the bolt above and below plate 15 hold the plate in various adjusted positions along the bolt. As viewed in Fig. 2, it will be seen that the bolts 21 flex about the portions 21a to permit adjustment of the motor in various positions about the point B, but in every such position the bolts 21 are rigidly secured to the plate 15 at one end and the bolts are rigidly secured to a fixed support at the other end.

By the use of my improved structure herein disclosed, it is possible to obtain a very fine adjustment of belt tension which is not disturbed by a motor rotating at high speeds. There are no springs having a free play which would give a period of vibration to the driving or driven equipment and there are no parts to slip out of adjustment or to wear, such as is commonly found in adjusting devices of similar character. It results from the use of such a tensioning device that in equipment such as air conditioners a silent drive is provided for blowers, fans and the like, thus preventing the objectionable noise which often occurs at these points.

By the use of the term "plate" in the specification and claim I mean to include metal, fiber and the like, whether strictly of plate form or in the form of straps and bars.

In the specification and claim, by the use of the term "endless belt" I mean to include all endless flexible drives requiring a tension adjustment from time to time.

What I claim is:

Take-up means for a belt in driving relation with a shaft, comprising a base, support means for said shaft supported on said base and adjustable to various positions angularly about an axis parallel to said shaft, a bolt having one of its ends made substantially integral with said base as by welding, means for adjustably and rigidly connecting the other end of said bolt with said support means, and said bolt having a portion sufficiently flexible to permit it to accommodate itself to adjustment of said support means.

CHRISTIAN S. ANDERSEN.